(12) United States Patent
Krasowski et al.

(10) Patent No.: US 11,485,086 B2
(45) Date of Patent: Nov. 1, 2022

(54) REMOVING BUILD MATERIAL

(71) Applicant: HEWLETT-PACKARD DEVELOPMENT COMPANY, L.P., Spring, TX (US)

(72) Inventors: Wojciech Jerzy Krasowski, Sant Cugat del Valles (ES); Justin M. Roman, Vancouver, WA (US); Xavier Alonso Becerro, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 113 days.

(21) Appl. No.: 16/607,567

(22) PCT Filed: Apr. 27, 2018

(86) PCT No.: PCT/US2018/029756
§ 371 (c)(1),
(2) Date: Oct. 23, 2019

(87) PCT Pub. No.: WO2019/209310
PCT Pub. Date: Oct. 31, 2019

(65) Prior Publication Data
US 2021/0402694 A1 Dec. 30, 2021

(51) Int. Cl.
*B29C 64/35* (2017.01)
*B33Y 40/00* (2020.01)
*A47L 7/00* (2006.01)
*B08B 5/04* (2006.01)
*B29C 64/379* (2017.01)

(52) U.S. Cl.
CPC ............. *B29C 64/35* (2017.08); *A47L 7/009* (2013.01); *B08B 5/04* (2013.01); *B33Y 40/00* (2014.12); *B29C 64/379* (2017.08)

(58) Field of Classification Search
CPC ..... B29C 64/35; B29C 64/379; B29C 64/393; B29C 64/357; A47L 7/009; B08B 5/04; B33Y 40/00; B22F 10/68
See application file for complete search history.

(56) References Cited

U.S. PATENT DOCUMENTS

| 8,017,055 B2 | 9/2011 | Davidson et al. |
| 8,185,229 B2 | 5/2012 | Davidson |
| 8,827,681 B2 | 9/2014 | Chen et al. |
| 9,399,256 B2 | 7/2016 | Buller et al. |
| 2002/0090410 A1 | 7/2002 | Tochimoto et al. |
| 2005/0116391 A1 | 6/2005 | Lindemann |
| 2010/0140852 A1 | 6/2010 | Kritchman et al. |

(Continued)

FOREIGN PATENT DOCUMENTS

| CN | 103213279 | 7/2013 |
| CN | 103921441 | 7/2014 |

(Continued)

OTHER PUBLICATIONS

Pei Xiaomin, Creation Methodology, Dec. 31, 2015, p. 121, Southwest Jiaotong University Press, Chengdu, China.

*Primary Examiner* — Mary Lynn F Theisen
(74) *Attorney, Agent, or Firm* — HP Inc. Patent Department

(57) ABSTRACT

An example method to remove build material from a container is described. In that example a pulsed gas flow may be induced in a conduit to aspirate build material in pulses from the container.

20 Claims, 7 Drawing Sheets

(56) References Cited

U.S. PATENT DOCUMENTS

| | | |
|---|---|---|
| 2010/0192806 A1 | 8/2010 | Heugel et al. |
| 2014/0265047 A1 | 9/2014 | Burris et al. |
| 2016/0200053 A1 | 7/2016 | Chen et al. |
| 2017/0326803 A1 | 11/2017 | Chanclon et al. |
| 2018/0009007 A1 | 1/2018 | Craft |
| 2018/0065296 A1 | 3/2018 | Mehl |
| 2018/0297284 A1* | 10/2018 | Fulop .................... B29C 64/165 |
| 2020/0384694 A1* | 12/2020 | Ceriani ................. B29C 64/153 |

FOREIGN PATENT DOCUMENTS

| | | | |
|---|---|---|---|
| CN | 104290325 | 1/2015 | |
| CN | 104385588 | 3/2015 | |
| CN | 106003468 | 10/2016 | |
| CN | 107584767 A | 1/2018 | |
| EP | 3112136 A3 | 3/2017 | |
| WO | WO-2017194149 A1 * | 11/2017 | ........... B29C 64/153 |

\* cited by examiner

REMOVING BUILD MATERIAL

BACKGROUND

In 3D printing technology three-dimensional objects are generated in a layer-wise manner. In some examples, layers of build material are successively formed and portions of each layer may be selectively solidified to form each layer of an object. In some examples, un-solidified build material may be removed from solidified objects after a printing process so that the solidified objects can be extracted.

DETAILED DESCRIPTION

Figure 1:
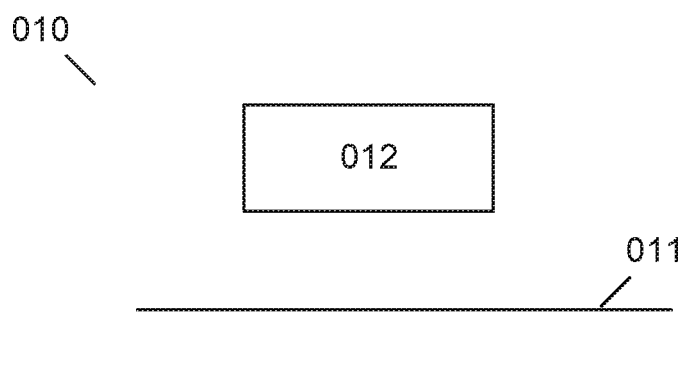
FIG. 1 schematically shows an example of a system to remove build material.

In 3D printing technology three-dimensional objects are generated from build material in a layer-wise manner. Build material may be powder based, particulate or grained material and may encompass dry and wet build material. Build material may comprise at least one of plastic, thermoplastic, polymers, acrylics, polyesters, silicones, polyamides, nylon, organic material, metals or ceramics. In some examples, particles forming the build material may have different sizes or shapes and in some examples build material may comprise different materials, binders, additives or fillers. Particles constituting build material may be, for example, spherical, fiber-shaped, elongated, flat, cylindrical, polyhedron-shaped or flaked.

In some examples of 3D printing technology, consecutive layers of build material are formed and portions per build material layer are selectively solidified, so that layer-by-layer solidified portions of build material form a three-dimensional object. Solidification of build material may be based, for example, on melting, binding, sintering, fusing, curing or coalescing. In some examples, an agent is deposited onto a section of a build material layer and by applying energy to the build material layer and agent the section solidifies.

In some examples of 3D printing technology, build material layers are formed on a platform in a build unit. A build unit may define a three-dimensional space within which three-dimensional objects can be generated. A build unit may be a container and may be open. A platform may be movable parallel to a side of the build unit, so that successively build material layers can be formed on top of each other and portions of build material layers can be selectively solidified. In some examples, a build unit contains solidified three-dimensional objects and un-solidified build material after a 3D printing process is finished or during a 3D printing process.

In some examples of 3D printing technology, un-solidified build material may be removed from the solidified objects. In some examples, un-solidified build material encloses solidified object in a so called cake. For example, un-solidified, loose build material may be removed from the build unit comprising solidified objects and un-solidified build material, so that the solidified objects can be accessed and extracted. In some examples, un-solidified build material may be sucked from a build unit with a conduit, e.g. a hose or a tube. In some examples, a user may hold the conduit so that an open end of the conduit is within the build unit to remove lose build material from the build unit. In some examples, a postprocessing station may remove build material from the build unit in an automated or in a semi-automated manner.

The examples described herein are related to a system and a method to remove build material from a container, e.g. from an element of a 3D printing system such as a build unit. In examples described herein, build material may be removed from a container by pulsed aspiration. For example, pulses of gas flow may be induced in a conduit to remove build material from a container, wherein the pulses of gas flow entrain build material in the container and build material is thus transported with the gas flow through the conduit. Some examples described herein may reduce the amount of time to remove build material from a container, such as from a build unit, and solidified objects may be de-caked, or otherwise have non-solidified build material removed, and may be accessible faster. For example, when a pulsed gas flow is induced, gas flow may be turbulent in the container and substantially unsteady through the conduit, so that build material in the container may become airborne and more build material may be entrained by the gas pulses compared to a steady gas flow.

FIG. 1 schematically shows an example of a system (010) to remove build material. The system comprises a conduit (011) having a first open end to remove build material from a container when a gas flow is induced and a controller (012) to control a component of the system (010) to induce a pulsed gas flow in the conduit (011) to remove build material from the container. The container may be an element of a 3D printer and may contain build material, e.g. un-solidified build material such as loose powder, to be removed or to be transported and gas, e.g. air. The container may be a replaceable element of a 3D printer or may be a container to store or hold build material, e.g. to hold a cake of solidified and un-solidified build material or to store build material in a supply container or in a storage cavity.

A conduit (011) may be a hose, a tube, a pipe, a sleeve, or the like, to remove build material from a container when a gas flow is induced therein. For example, build material may be sucked or aspirated from a container through an open end, such as an opening (021) of the conduit (011) illustrated schematically in FIG. 2, and build material may flow with the induced gas flow through the conduit (011). A conduit (011) may be connectable to a container (022) and may be in a fixed position while build material (023) may to be removed from the container (022). In some examples, a conduit (011) may be held by an operator and the open end of the conduit (011) may be placed within or in proximity to the container (022) to remove build material (023). For example, a container (022) may have an outlet, such as an opening (024) depicted in FIG. 2, through which build material can be removed. In some examples, the first open end (021) of the conduit (011) is connectable, e.g. via an outlet opening (024), to a build unit or a vessel comprising un-solidified build material and three-dimensional objects to remove un-solidified build material from the build unit or vessel so that the three-dimensional objects may be accessed.

A controller (012) may be a microcontroller, an integrated circuit, an embedded system or any combination of circuitry and executable instructions representing a control program to perform a controlling operation as will be described in more detail with reference to FIG. 5. A controller (012) may comprise circuitry to control a component of the system (010) to induce a pulsed gas flow in the conduit (011). For example, a controller (012) may control a vacuum pump, a valve, a gas inlet, a gas outlet, a fan, a pressurized gas source, a vacuum component, or another component of the system to induce a pulsed gas flow in the conduit (011). For example, the controller (012) may control the operation, an electrical power, a frequency, or an input signal of a component of the system (010) to induce a pulsed gas flow. For example, the controller (012) may modulate an input signal of a component so that the component operates in a pulsed manner or in a cyclic operation. For example, the controller (012) may control a component to operate in a duty cycle so that a pulsed gas flow is induced. In some examples, the controller (012) may receive a signal from a component of the system (010) and may control a component to induce a pulsed gas flow based on the received signal, e.g. in a feedback-loop.

Figure 2:
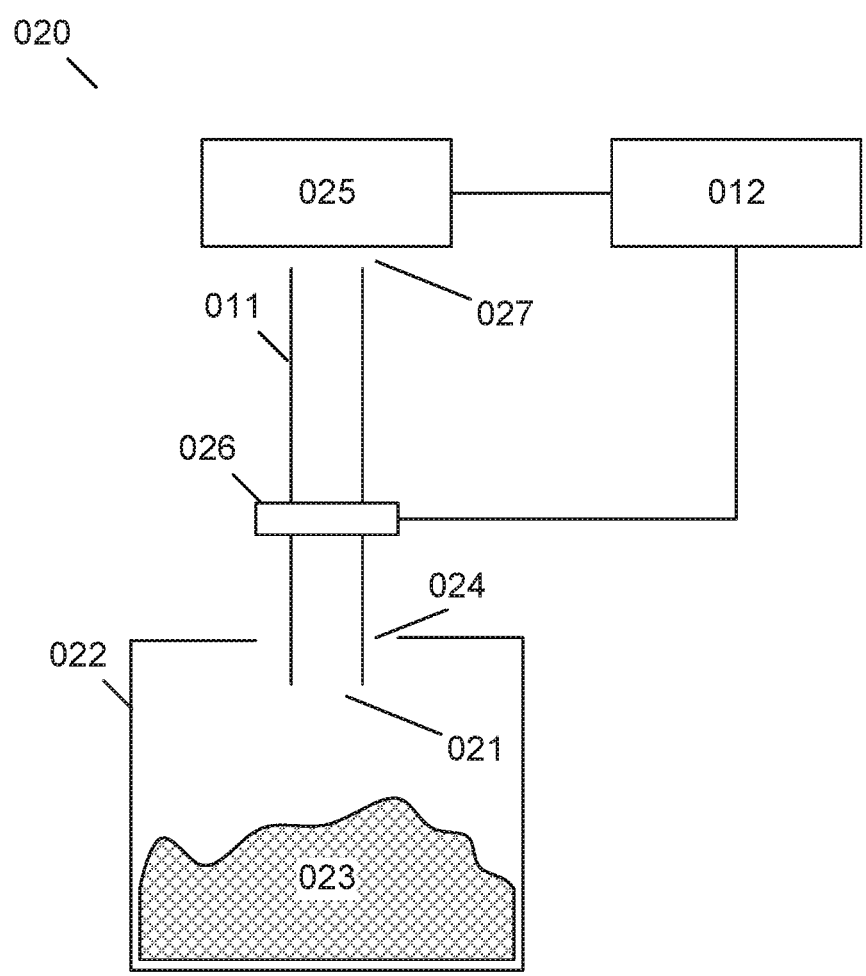
FIG. 2 schematically shows an example of a system to remove build material.

In some examples, a system to remove build material may comprise a vacuum pump (025), for example as illustrated in FIG. 2. The vacuum pump (025) may be connected to a second open end (027) of the conduit (011), such as to a second open end (027) opposing the first open end (021) of the conduit (011). The vacuum pump (025) may be to generate a pressure differential through the conduit (011) and the vacuum pump (025) may be sealed to the second open end (027). For example, the vacuum pump (025) may apply a suction force and may induce a gas flow in the conduit (011). In some examples, a controller (012) may control the vacuum pump (025) to induce a pulsed gas flow in the conduit (011).

For example, a vacuum pump (025) may be controlled to induce a gas flow to start and stop in cycles or the vacuum pump (025) may be controlled to change in cycles between at least two operation modes so that a pulsed gas flow is induced in the conduit (011). In some examples, the operation mode of a vacuum pump (025) may be inverted, such as to operate like a fan or a blower, e.g. to induce suction pulses of gas flow and puffing pulses of gas flow flowing in an opposite direction. The controller (012) may control the vacuum pump (025) to abruptly trigger gas flow or abruptly generate a pressure differential so that a surge of gas flow is induced from the container (022) through the conduit (011). For example, a surge of gas flow may be a pulse of gas flow comprising a portion of substantially unsteady gas flow to aspirate build material from the container (022). The vacuum pump (025) may be controlled to run in a duty cycle so that a pulsed gas flow is induced in the conduit (011). In some examples, a vacuum pump (025) may be controlled to induce a gas flow in the conduit (011) and the gas flow may be intermitted or blocked, e.g. by a shutter, a valve, etc., so that a pulsed gas flow is induced.

In some examples, a system to remove build material may comprise a valve (026) at the conduit (011), such as illustrated in FIG. 2. For example, a valve (026) may be a pressure valve, a butterfly valve, or another suitable valve to allow or regulate gas flow through the conduit (011). The valve (026) may be positioned between the first (021) and the second open end (027) of the conduit (011). A controller (012) may control the valve (026) to be in one of fully open state, a fully closed state, or an intermediate state between fully open and fully closed. For example, the valve (026) may be controlled by the controller (012) to induce a pulsed gas flow.

For example, a controller (012) may control the valve (026) to be closed so that a vacuum is generated between the valve (026) and the second open end (027) within the conduit (011). For example, the vacuum pump (026) may be controlled to generate a pressure differential between the container (022) and the closed portion of the conduit (011) while the valve (026) is controlled to be closed. Then, the controller (012) may control the valve (026) to open so that a pulse or surge of gas flow is induced in the conduit (011). For example, the controller (012) may control the valve (026) to open abruptly, or substantially instantaneously compared to an overall duty cycle of the valve. For example, the controller (012) may control the valve (026) to open during a first period of time and to close a during second period of time in alternating cycles, such as in a duty cycle, to induce a pulsed gas flow. A duty cycle may not be constant during build material removal. A pulse or surge of gas flow induced by controlling the valve (026) to open may create a period of substantially unsteady gas flow.

In some examples, a valve (026) may be positioned in proximity to the first open end (021) of the conduit (011). For example, a pulse of gas flow induced by controlling the valve (026) to open may entrain more build material particles when a higher pressure differential is generated before opening or when a larger portion of the conduit (011) is evacuated before opening the valve (026). In some examples, an induced pulse of gas flow may comprise a longer period of unsteady flow when a higher pressure differential is generated within the closed conduit (011) or when a larger portion of the conduit (011) is evacuated. For example, a valve (026) may be positioned at the first open end (021), or about 1 centimeters, 2 centimeters, 5 centimeters, 10 centimeters or about 20 centimeters from the first open end (021) of the conduit (011).

Figure 3:
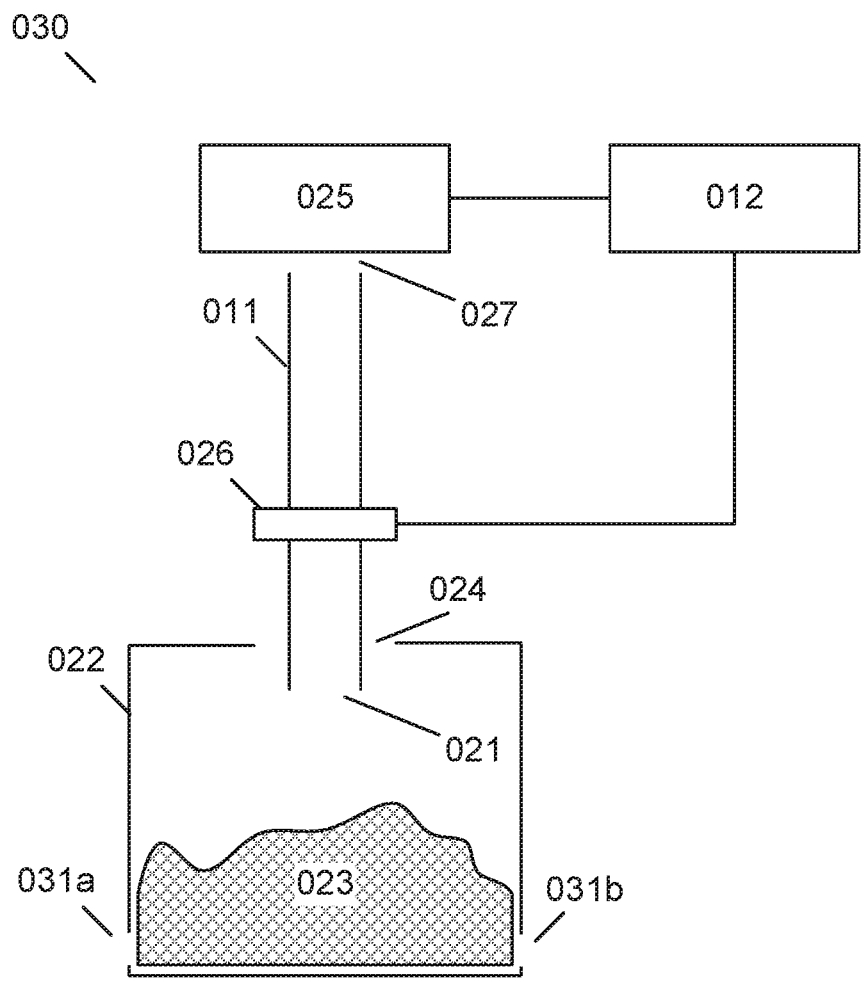
FIG. 3 schematically shows an example of a system to remove build material.

In some examples, the container (022) may have a gas inlet or may not be air-tight so that gas can flow into the container (022) and may cause build material (023) to become airborne when a pulsed gas flow is induced therein. For example, as illustrated in FIG. 3, a container (022) may have gas inlets (031a, 031b) at a lower portion of the container (022) or at another portion of the container (022). Gas inlets in a container (022) may facilitate aspiration of build material (023) when a pulsed gas flow is induced. For example, ambient gas, such as air from the environment around the container (022), may flow through an inlet (031) into the container (022) when sucked by a pressure differential generated through the conduit (011) and may swirl, disperse or raise build material (022), e.g. loose powder, in the container (022) and thus build material (023) may become airborne. When the controller (012) controls, for example, the valve to close after a duty cycle, raised, airborne or dispersed build material (022) may settle or float down. Thus, aspirating build material in pulses may induce a turbulent movement of airborne build material in the container (022) and build material removal may be facilitated.

In some examples, when a pulsed gas flow is induced through the conduit (011) to remove build material through a first open end (021), another end of the conduit (011), e.g. second opening (027), may direct a mixture of build material and gas of the pulsed gas flow to a build material separator (not shown in Figures) to separate build material from gas, e.g. before a vacuum pump (025). A build material separator may comprise a sieve, a filter, an obstacle, a barrier or may be based on a cyclonic separation principle to separate build material from gas. For example, a separator may separate material, gas molecules or particles due to different weight, momentum, charge, size or speed. In some examples, un-solidified build material may be separated partially from gas. In some examples, un-solidified build material separated from gas may be stored in another container, such as a storage container or supply container, and may be recycled.

In some examples, an open end (021) of a conduit (011) may comprise several open ends, such as at several arms or branches of a conduit (011), to remove build material from a plurality of containers (not shown in Figures) by pulsed aspiration. For example, each arm or branch of a conduit (011) may be connected to an outlet of a container. A vacuum pump, e.g. attached at a second end of the conduit, may be controlled to generate a pressure differential, such as to be constantly applying a suction force through the conduit and the arms or branches leading to the plurality of containers. In some examples, a plurality of valves, e.g. each valve positioned at an arm or at a branch of the conduit (011), may be controlled to induce a pulsed gas flow from each container, and e.g. through each arm or branch of the conduit, to remove build material from each container using a pulsed gas flow.

For example, the controller (012) may control to close all valves so that a vacuum builds up within the closed portion of the conduit. The controller (012) may control to open at least one valve to induce a surge or a pulse of gas flow from at least one container so that build material is removed from the container through the respective arm or branch of the conduit (011). In some examples, the controller (012) may control to close all valves again so that a vacuum builds up again and then may open at least one other valve to induce a pulse of gas flow from another container to remove build material. In some examples, pulses of gas flow may be induced from each container of the plurality of containers through the arms or branches of conduit (011) by operating each valve in a duty cycle. In some examples, a component of the system (010) may induce for each container connected to an open end of the conduit (011) pulses of substantially unsteady gas flow.

In some examples, the controller (012) may be to control a component of the system (010) to induce a pulsed gas flow based on a parameter of the build material to be removed from a container (022). For example, build material type, a rate of build material removal, a temperature of build material in the container (022) or the conduit (011), a flow rate, a pressure, a mass or volume of build material to be removed or already removed, or another parameter of the build material or the gas flow may be determined or measured and a corresponding signal may be received by the controller (012). The controller (012) may control a component of the system (010) in a closed-loop manner to induce a pulsed gas flow based on the received parameters. For example, a duty cycle of a component may be controlled by the controller (012) based on the received signal. Such as, if a build material removal rate decreases or drops below a threshold value, a duty cycle of the component to induce pulsed gas flow may be modified. In some examples, a controller (012) controls a component to induce a pulsed gas flow based on previous measurements or observations, such as on empirical data. For example, a controller (012) may control a valve to open and close in a duty cycle based on previous tests to improve build material removal.

Figure 4A:
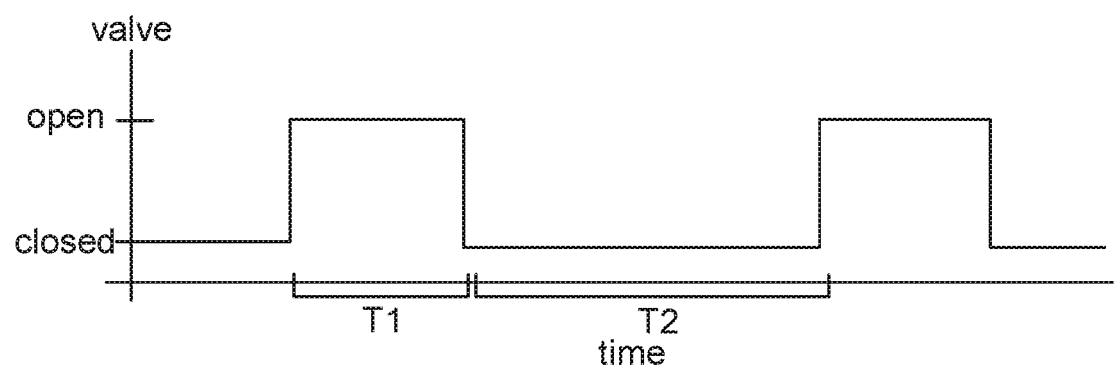
FIGS. 4*a-c* schematically show examples of time evolution of parameters of a system to remove build material.

FIG. 4a schematically shows an example of a duty cycle of a valve, e.g. valve (026) of system (020) in FIG. 2 to induce a pulsed gas flow in a conduit (011). FIG. 4a schematically shows a state, e.g. open or closed, of the valve over time. The state of the valve may be controlled by a controller to induce a pulsed gas flow, e.g. by controlling an input signal or a power supply. The following examples of a duty cycle of a valve to induce a pulsed gas flow may be applicable to any other component of a system (010) to remove build material, wherein the component is controllable in a duty cycle or in a cyclic or periodic operation mode to induce a pulsed gas flow, as described herein.

Figure 4B:
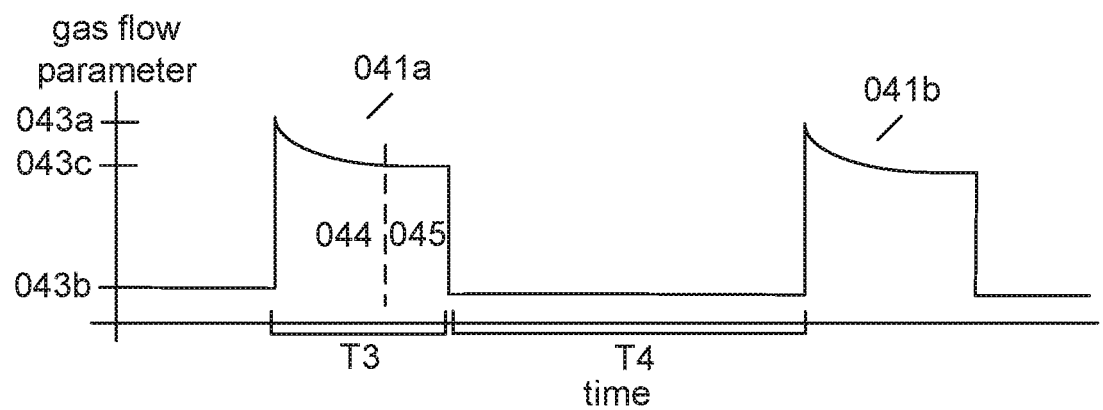

FIG. 4b schematically shows an example of pulsed gas flow induced in a conduit by a duty cycle of a valve as illustrated in FIG. 4a. The gas flow depicted in FIG. 4b is an example of a flow parameter curve describing pulses of gas flow induced. A controller (012) may control a component to induce pulses of gas flow described by various curves different than the flow parameter curve depicted in FIG. 4b. Gas flow through a conduit may be described by flow parameters, such as the mean velocity of gas particles constituting the gas flow, the rate of mass flowing through the conduit, the volume of gas flowing per time through a portion of the conduit, the number of gas particles flowing through a portion of the conduit per time or a combination thereof. Flow parameters of an induced gas flow may be related to a duty cycle of a valve controlled by a controller (012) or to a duty cycle or a controlled operation of a component of a system (010) to remove build material.

Figure 4C:
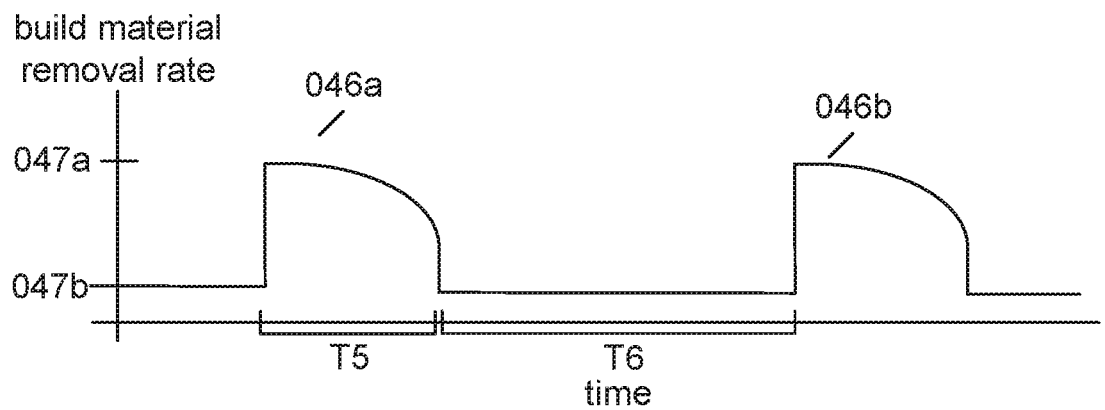

FIG. 4c schematically shows an example of build material removal rate through a conduit when a pulsed gas flow is induced. For example, a build material removal rate may be measured or may be determined based on a mass or volume of build material extracted per time interval. In some examples, a build material removal rate may be related to or may depend on flow parameters of the induced pulsed gas flow to transport build material, e.g. related to flow parameters of a pulsed gas flow induced by a duty cycle of a valve as illustrated in FIGS. 4a and 4b. In some examples, a build material removal rate may further depend on parameters like mass or volume of build material in a container, build material type, temperature, ambient conditions, mechanical components, humidity, etc.

For example, a valve may be controlled to be open for a first period of time (T1) and may be controlled to be closed for a second period of time (T2). Correspondingly, a pulse (041a) of gas flow may be induced for a pulse length (T3) and build material may be aspirated in a pulse (046a) during a cycle (T5) when the valve is opened, followed and preceded by substantially no gas flow for a duration (T4) and no build material removal for a duration (T6) when the valve is closed. In some examples, the opening time (T1) of a valve, a pulse length (T3) of the gas pulse and the cycle of powder removal (T5) may be related, e.g. may start at substantially the same time or may last substantially the same time. In some examples, the closing time (T2) of the valve, a time span (T4) without gas flow and a time span without powder removal (T6) may be related. In some examples, a pulse of gas flow (041a) or a cycle of powder removal (046a) may be delayed in time with respect to an opening of a valve, e.g. due to inertia of the gas particles and inertia of the build material. In some examples, a pulse of gas flow (041a) and a cycle of powder removal (046a) may be substantially instantaneously initiated by opening a valve, such as depicted in FIGS. 4a-c.

A controller may control a valve to open and close in a duty cycle so that a plurality of gas pulses (041a, 041b) may be induced and build material may be aspirated in pulses (046a, 046b). For example, a valve may be controlled to open once, twice, three-times, four-times, five-times or more times per minute or once, twice, three-times, four-times, five-times or more times every ten minutes. Each duty cycle of a valve may be defined by an opening time (T1) and a closing time (T2). In some examples, opening and closing time may be controlled to be constant along various duty cycles. In some examples, an opening time (T1) may be about one second, about five seconds, about ten seconds, about twenty seconds, about forty seconds or about a minute. A closing time (T2) may be about one second, about five seconds, about ten seconds, about twenty seconds, about forty seconds, about a minute, about two minutes, about four minutes, about six minutes or about eight minutes. In some examples, the opening time (T1) may be about 1%, 2%, 5%, 10%, 20%, 40%, 60%, 80%, 100%, 120%, 150% or 200% of the closing time (T2). In some examples, a controller may modify the duty cycle of the valve, e.g. based on a feedback signal or a measurement, and the duty cycle may not be constant but may vary over time. In some examples, the pulse length (T3) of a gas pulse and the cycle of powder removal (T5) may correspond or may be substantially the same as the opening time (T1) of a valve triggering the pulse of gas flow (041a) and the pulse of powder removal (046a). In some examples, by controlling a duty cycle of a valve or a component of the system (010) pulses of an induced gas flow may be controlled.

In some examples, an induced pulse of gas flow (041a) may have a peak value (043a), such as schematically shown in the example of FIG. 4b, and a powder removal rate may have a peak value (047a), such as schematically shown in FIG. 4c. In some examples, a peak value of gas flow (043a) may relate to a peak value of powder removal rate (047a). In some examples, a duration of no gas flow (T4) may be characterized by a lower flow parameter (043b), such as an average of a flow parameter during the duration (T4) of no gas flow, e.g. a lower flow parameter (043b) may be zero such as when a valve is closed. In some examples, a valve may be partially closed during a period of time (T2) so that a reduced amount of gas may flow through a conduit, e.g. such that lower flow parameter (043b) may be non-zero and a lower build material removal rate (047b) may be non-zero.

An induced pulse of gas flow (041a), e.g. triggered by opening a valve, may have a peak flow parameter (043a) or an average flow parameter over the pulse length (T3) which is at least 50%, at least 100%, at least 500%, at least 1000% or at least 10000% higher than a lower flow parameter (043b) describing the following or preceding reduced gas flow, e.g. when a valve is not closed completely. In some examples, a build material removal rate may have a peak value (047a), e.g. triggered by an induced gas flow, and a peak value (047a) of build material removal or an average build material removal rate over the cycle length (T5) may be at least 50%, at least 100%, at least 500%, at least 1000% or at least 10000% higher than a lower powder removal rate (047b) describing the following or preceding period of time (T6), e.g. when a reduced gas flow is induced. In some examples, a build material removal rate may decline over time when a volume of build material in the container decreases, such as at the end of build material removal when basically no more build material is left to remove.

In some examples, a controller (012) may control a component of the system (010) to induce a pulse (041a) of substantially unsteady gas flow or the induced pulse of gas flow (041a) may have a portion (044), e.g. for a period of time, of substantially unsteady gas flow. A flow parameter of unsteady gas flow may be substantially not constant over time. For example, a flow parameter may decrease from a peak value (043a) to a stable or constant value (043c) during a pulse length (T3), e.g. as shown in the example flow curve of FIG. 4b. In some examples, an induced pulse of gas flow (041a) may have a portion (045), e.g. for a period of time, of substantially steady gas flow. A flow parameter of steady gas flow may be constant over time, e.g. flow parameter (043c) may be constant for the portion (045) of steady gas flow.

In some examples, the controller (012) may control a component of the system (010) to induce a pulse of gas flow (041a) having a portion (044) of unsteady gas flow which may be more than 25%, more than 50%, more than 75% or 100% of the pulse length (T3) of the pulse of gas flow (041a). For example, a controller may control a valve to close when a steady flow plateau (045) is reached. In some examples, a controller may be to minimize a portion of steady flow (045), such as in a feedback-loop or based on empirical knowledge. In some examples, a build material removal rate may stabilize or decrease when substantially steady state gas flow is reached. In some examples, a build material removal rate is higher during unsteady flow of the pulse of gas flow (041a). For example, unsteady gas flow may induce turbulences and build material may become airborne in a container. In some examples further aspects may modify a build material removal rate, e.g. build material type, density of a cake of solidified and un-solidified build material, humidity, temperature, etc.

In some examples, a valve may be controlled to open or close relatively abrupt or substantially instantaneously or a controller (012) may control another component of a system (010) to relatively sudden or abruptly start or stop a duty cycle or change an operation mode. For example, a valve may open or close, e.g. from a closed state to a fully open state, within less than 10%, less than 5% or less than 1% of the overall opening time (T1). In some examples, a component of a system (010) may be controlled to change between two operation modes or states within less than 10%, less than 5% or less than 1% of the overall duty cycle. In some examples, a pulse of gas flow (041a) or a pulse of build material aspiration (046a) may be induced by opening a valve and may be delayed with respect to opening the valve by less than 10%, less than 5% or less than 1% of the overall opening time of the valve (T1). In the examples of FIGS. 4a-c, a pulse of gas flow (041a) and build material removed (046a) with the pulse of gas flow may be initiated substantially instantaneously when opening a valve and may be may be intermitted substantially instantaneously when closing the valve.

Figure 5:
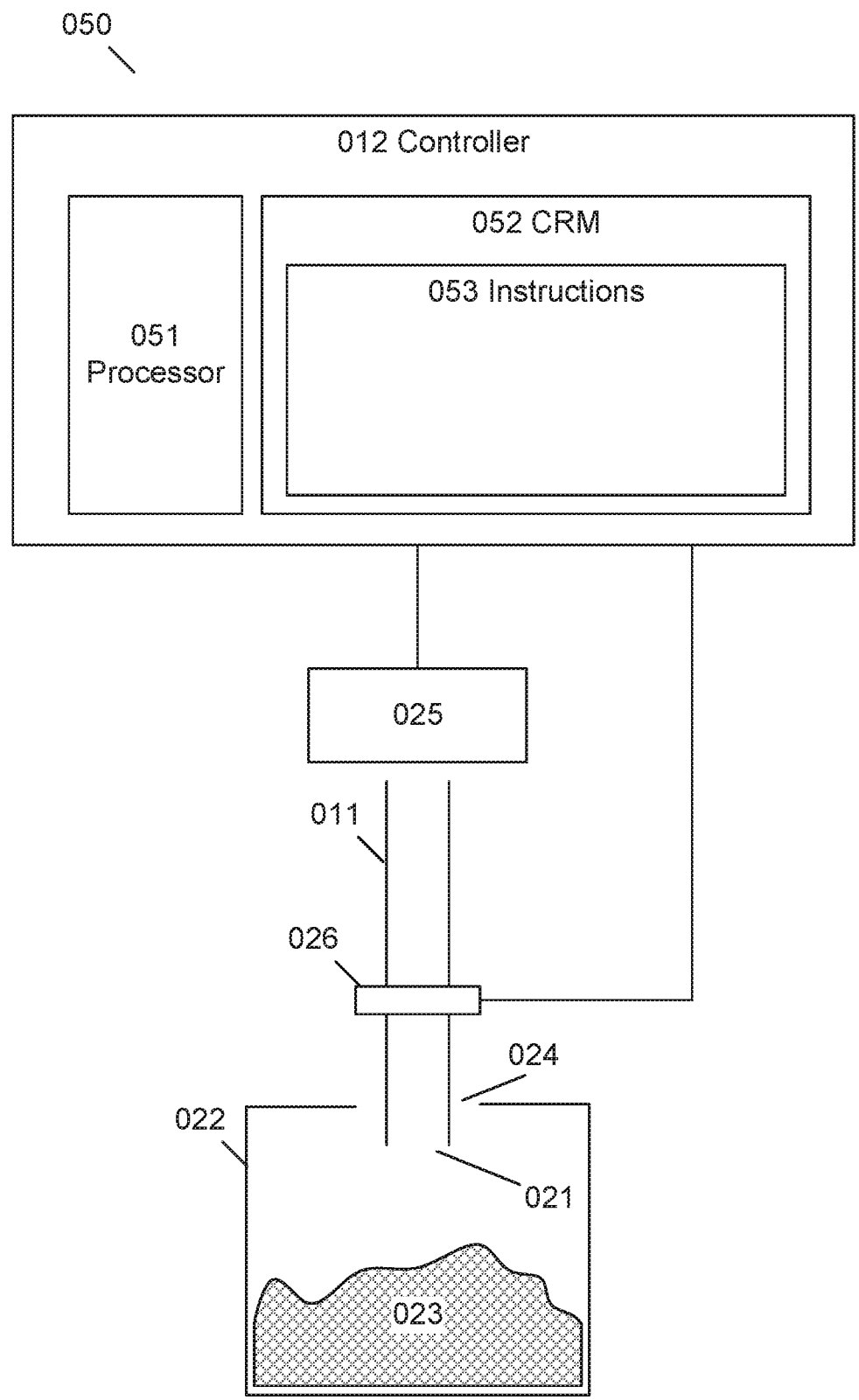
FIG. 5 schematically shows an example of a computer readable storage medium comprising instructions to control a system to remove build material, the instructions executable by a processor.

FIG. 5 schematically shows a controller, e.g. controller (012) of system (010), comprising instructions to remove build material from container. A controller (012) may comprise circuitry to control a vacuum pump (025) and a valve (026) of the system (010). In some examples, the controller (012) may comprise circuitry to control or to receive a signal from components of a 3D printer or from the system (010) to remove build material. A controller (012) comprises a processor (051) having any appropriate circuitry capable of processing (e.g. computing) instructions, such as one or multiple processing elements, e.g. a central processing unit (CPU), a graphical processing unit (GPU), a semiconductorbased microprocessor, a programmable logic device (PLD), or the like. Processing elements may be integrated in single device or distributed across devices.

A controller (012) comprises a computer-readable storage medium (052) comprising instructions (053) to control a vacuum pump (025) to build up negative fluid pressure in a closed conduit (011), such as when a valve (026) is closing a portion of the conduit (011), and to control a valve (026) to open the conduit (011) to a build material container (022), so that build material is removed with a pulse of fluid flow flowing from the container (022) through the conduit (011). The computer readable storage medium (052) may comprise volatile, e.g. RAM, and nonvolatile components, e.g. ROM, hard disk, CD-ROM, flash memory, etc. and may be an electronic, magnetic, optical, or other physical storage device that is capable of containing (i.e. storing) executable instructions (053). A storage medium (052) may be integrated in the same device as the processor (051) or it may be separate but accessible to the processor (051). The instructions (053) comprise instructions executable by the processor (051) and the instructions (053) may implement a method to remove build material.

In some examples, the computer-readable storage medium (052) may further comprise instructions to control the valve to open and close in a cycle, so that a pulsed fluid flow is induced to remove build material from the container. For example, instructions may comprise instructions to control a valve to induce a pulsed fluid flow as described in the sections of FIGS. 4a-c. A fluid may comprise gas, air, a liquid, a liquid composition or humidified air. A vacuum pump (026) may be a pump to pump a liquid through the conduit.

Figure 6:
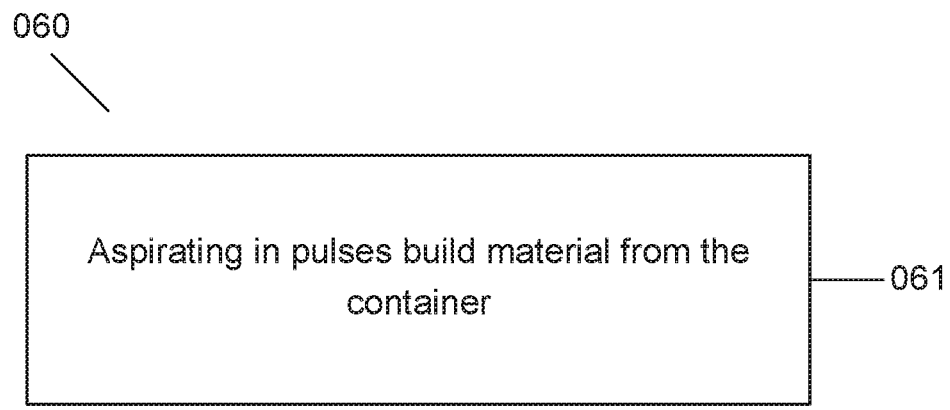
FIG. 6 shows a flow diagram of an example of a method to remove build material.

FIG. 6 schematically shows a flow diagram of an example of a method (060) to remove build material from a container. The method (060) may be implemented as instructions of a controller (012) to control a system (010), as illustrated in FIG. 1 or FIG. 5. The method (060) includes aspirating in pulses build material from the container (061). For example, the method may comprise inducing pulses of gas flow from the container through a conduit connected to the container to aspirate in pulses build material from the container. The induced pulses of gas flow may cause turbulence in the container and build material may become airborne so that pulses of gas flow may entrain build material and may transport build material from the container through the conduit. In some examples, each pulse of the induced gas flow may have a portion of unsteady gas flow, such as for example described in the sections of FIGS. 4a-c.

Figure 7:
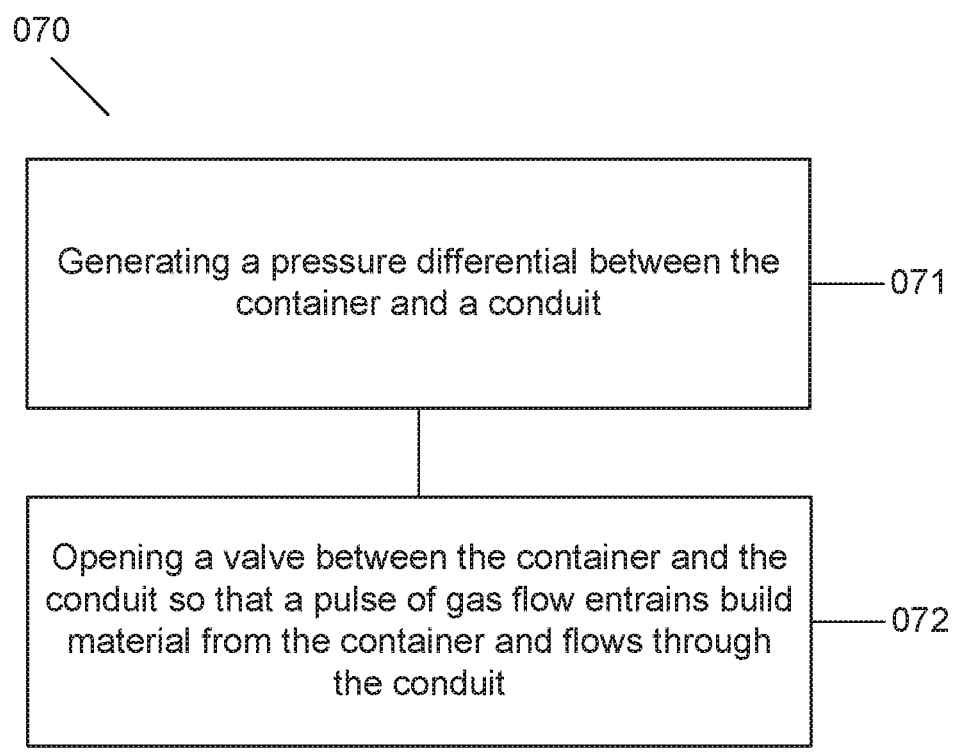
FIG. 7 shows a flow diagram of an example of a method to remove build material.

FIG. 7 schematically shows a flow diagram of an example of a method (070) to remove build material. The method (070) may further comprise generating a pressure differential between the container and the conduit (071). For example, a vacuum pump may be attached to a conduit, as shown in FIG. 2, and may apply a suction force so that a closed portion of the conduit is evacuated or gas and build material may be aspirated from a container when the conduit is open. The method (070) may further comprise opening a valve between the container and the conduit so that a pulse of gas flow entrains build material from the container and flows through the conduit (072). For example, a valve may be positioned at the conduit, as illustrated in FIG. 2, and may trigger a pulse of gas flow from the container through the conduit. A pulse of gas flow may be unsteady or may have an unsteady portion of gas flow. For example, a valve may be opened abruptly or substantially instantaneously as described in the sections of FIGS. 4a-c.

Figure 8:
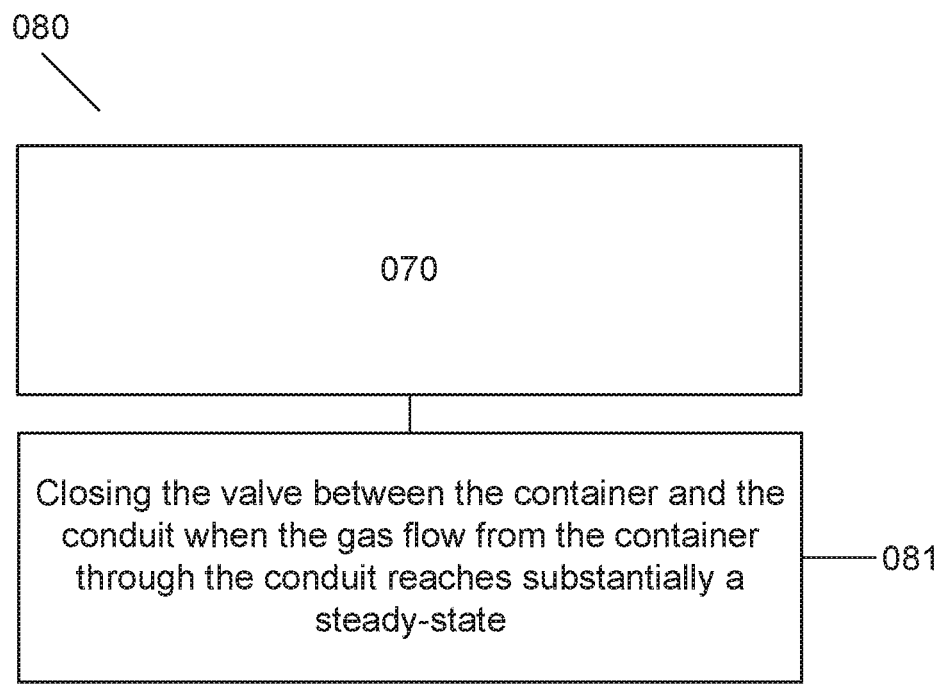
FIG. 8 shows a flow diagram of an example of a method to remove build material.

FIG. 8 schematically shows a flow diagram of an example of a method (080) to remove build material. The method (080) may further comprise closing the valve between the container and the conduit when gas flow from the container through the conduit reaches substantially a steady-state (081). For example, as discussed in the sections describing FIGS. 4a-c, a flow parameter of a pulse of gas flow may reach a constant value after opening the valve for a period of time. Based on previous measurement, tests or on a feedback signal of the system a valve may be closed before, after or when a flow parameter of the gas flow reaches a substantially constant state. In some examples, build material removal may be more efficient during a time of unsteady gas flow of the induced pulse of gas flow.

In some examples, a method to remove build material may further comprise closing the valve between the container and the conduit for at least one second, about five seconds, about ten seconds, about twenty seconds, about forty seconds or about a minute so that turbulent airflow stops to allow build material to settle in the container and opening the valve between the container and the conduit for a period of at least one second, about five seconds, about ten seconds, about twenty seconds, about forty seconds or about a minute so that build material is aspirated from the container, e.g. as described in the sections for FIGS. 4a-c. In some examples, a valve may operate in a duty cycle, e.g. opening and closing periodically, to induce a pulsed gas flow until build material removal from a container is terminated. A duty cycle may not be constant and may vary over various cycles.

Figure 9:
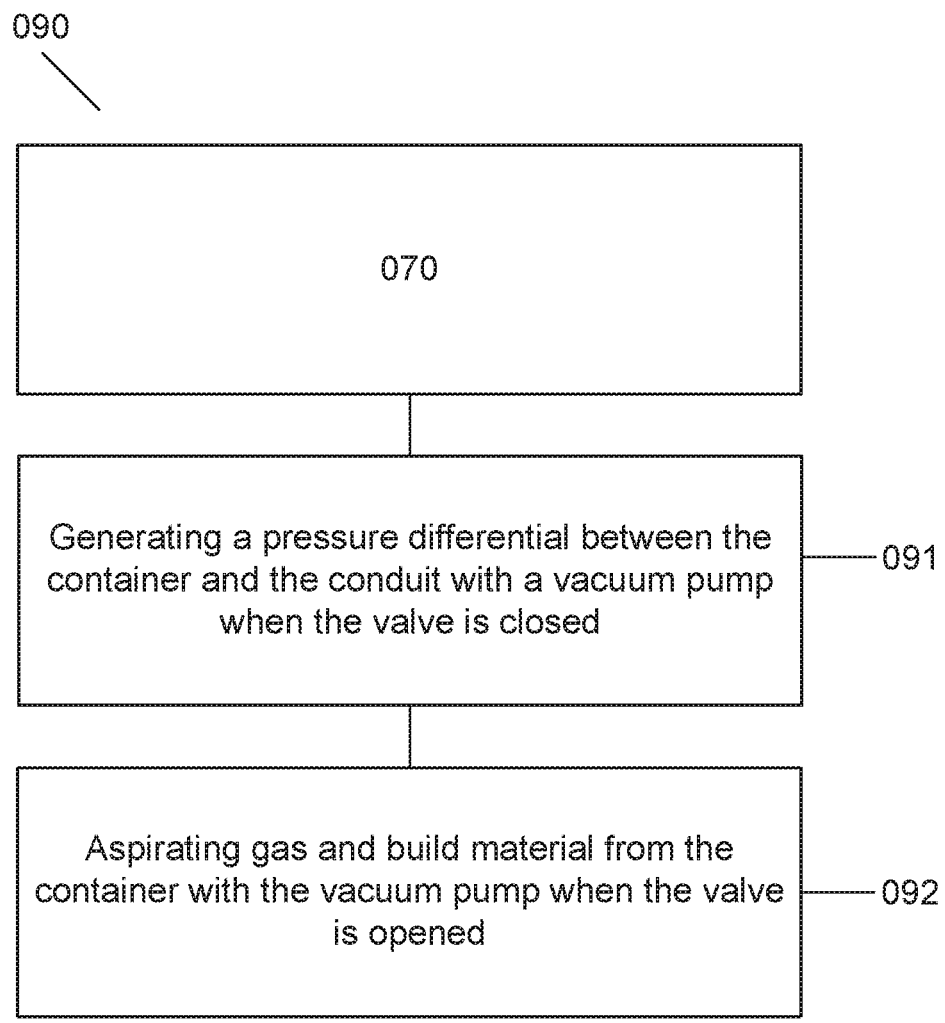
FIG. 9 shows a flow diagram of an example of a method to remove build material.

FIG. 9 schematically shows a flow diagram of an example of a method (090) to remove build material. The method (090) may further comprise generating a pressure differential between the container and the conduit with a vacuum pump when the valve is closed (091) and aspirating gas and build material from the container with the vacuum pump when the valve is opened (092). For example, a vacuum pump, such as vacuum pump (025) shown in FIG. 2, may constantly apply a suction force through the conduit. Thus, when the valve is closed, the conduit may be evacuated and a pressure difference between the conduit and the container is generated, and when the valve is opened a pulse of unsteady gas flow may be induced to compensate the generated pressure difference and further gas and build material may be aspirated by the suction force of the vacuum pump.

Examples as described herein can be implemented according to the following clauses:

Clause 1: A system comprising a conduit having a first open end to remove build material from a container, when a gas flow is induced in the conduit, and a controller to control a component of the system to induce a pulsed gas flow in the conduit to remove build material from the container.

Clause 2: The system of clause 1, wherein the controller is to control a vacuum pump or a valve of the system to induce a pulsed gas flow, and wherein a pulse of gas flow comprises a portion of substantially unsteady gas flow to remove build material from the container.

Clause 3: The system of any preceding clause, further comprising a vacuum pump connected at a second open end of the conduit to generate a pressure differential and a valve at the conduit positioned between the first and the second open end and the valve being controlled by the controller, wherein a vacuum is generated in the conduit between the valve and the second open end when the valve is controlled to be closed, and wherein a pulse of gas flow is induced in the conduit when the valve is controlled to open.

Clause 4: The system of clause 3, wherein the valve is positioned at the conduit in proximity to the first open end.

Clause 5: The system of any preceding clause, wherein the controller is to control the component of the system to induce a pulsed gas flow based on a parameter of the build material to be removed.

Clause 6: The system of any preceding clause, wherein the first open end of the conduit is connectable to a build unit comprising un-solidified build material and three-dimensional objects to remove un-solidified build material from the build unit.

Clause 7: The system of any preceding clause, wherein the container has a gas inlet so that gas can flow into the container and may cause build material to become airborne when a pulsed gas flow is induced.

Clause 8: A method to remove build material from a container comprising aspirating in pulses build material from the container.

Clause 9: The method of clause 8, further comprising inducing pulses of gas flow from the container through a conduit connected to the container to aspirate in pulses build material from the container, wherein each pulse of gas flow has a portion of unsteady gas flow.

Clause 10: The method of any preceding clause, further comprising generating a pressure differential between the container and a conduit and opening a valve between the container and the conduit so that a pulse of gas flow entrains build material from the container and flows through the conduit.

Clause 11: The method of clause 10, further comprising closing the valve between the container and the conduit when the gas flow from the container through the conduit reaches substantially a steady-state.

Clause 12: The method of clause 10, further comprising closing the valve between the container and the conduit for at least one second so that turbulent airflow stops to allow build material to settle in the container and opening the valve between the container and the conduit for a period of at least one second so that build material is aspirated from the container.

Clause 13: The method of clause 10, further comprising generating a pressure differential between the container and the conduit with a vacuum pump when the valve is closed and aspirating gas and build material from the container with the vacuum pump when the valve is opened.

Clause 14: A non-transitory computer readable storage medium comprising instructions that, when executed by a processor, cause the processor to control a vacuum pump to build up negative fluid pressure in a closed conduit and to control a valve to open the conduit to a build material container, so that build material is removed with a pulse of fluid flow flowing from the container through the conduit.

Clause 15: The non-transitory computer readable storage medium of clause 14 further comprising instructions that, when executed by a processor, cause the processor to control the valve to open and close in a cycle, so that a pulsed fluid flow is induced to remove build material from the container.

The following terminology is understood to mean the following when recited by the description or the claims. The word "comprising" does not exclude the presence of elements other than those listed, the word "including" or "having" does not exclude the presence of elements other than those listed, "a", "an" or "the" does not exclude a plurality and a "series" or "plurality" does not exclude a singularity. The words "or" and "and" have the combined meaning "and/or" except combinations of listed features where at least some of such features and/or elements are mutually exclusive within the context.

All of the features disclosed in the claims and description (including drawings), and/or all of the elements of any method or process so disclosed, may be combined in any combination and order, except combinations where at least some of such features and/or elements are mutually exclusive.

In examples described herein, techniques and methods to remove build material are applicable to various additive manufacturing technique as would be obvious to a skilled person in the art. For example, a 3D printer may relate to e.g. a rapid prototyping system, a selective laser sintering system, a selective/direct laser melting system, an electron beam melting system, a binder-jet system, an inkjet 3D printing system, etc.

The invention claimed is:

1. A system comprising:
   a conduit having a first open end to remove build material from a container, when a gas flow is induced in the conduit;
   a vacuum pump to create a vacuum in the conduit;
   a valve in the conduit; and
   a controller to control vacuum pump and valve,
   wherein, at the beginning of a cycle, the valve is closed and the vacuum pump is operated for a first period of time to build up a differential pressure between the container and a portion of the conduit separated by the valve from the container;
   wherein the valve is then opened to release the differential pressure and to induce a pulsed gas flow into the conduit to remove build material from the container.

2. The system of claim 1,
   wherein, after a second period of time during which the valve is open, the controller is to start a new cycle by closing the valve to re-establish the differential pressure.

3. The system of claim 2, wherein the first period of time is longer than the second period of time.

4. The system of claim 1, wherein the controller is to operate the vacuum pump and the valve in a series of cycles, each cycle comprising
   the first period of time wherein the differential pressure is generated in the conduit when the valve is controlled to be closed,
   and wherein a pulse of gas flow is induced in the conduit when the valve is controlled to open.

5. The system of claim 1, wherein the valve is positioned at the conduit closer to a first open end at the container than the vacuum pump.

6. The system of claim 1,
   wherein the controller is to control the cycle and first period of time based on a parameter of the build material to be removed.

7. The system of claim 6, wherein the parameter is one of build material type, a desired rate of build material removal, and a temperature of the build material.

8. The system of claim 1, wherein the container is a replaceable build unit of a 3D printer structured to contain a cake formed by the 3D printer of solidified and un-solidified build material; and
   wherein the first open end of the conduit comprises a connector to connect to the build unit to remove un-solidified build material from the build unit.

9. The system of claim 1, wherein the container has a gas inlet so that gas can flow into the container and may cause build material to become airborne when a pulsed gas flow is induced.

10. The system of claim 1, wherein the conduit has multiple branches and the system comprises multiple valves in the branches of the conduit to be operated by the controller.

11. The system of claim 1, wherein a time to open the valve is less than 10% of a second period of time during which the valve is left open prior to closing the valve to begin a new cycle.

12. The system of claim 1, wherein a time to open the valve is less than 10% of a duty cycle comprising the first period of time and a second period of time during which the valve is left open prior to closing the valve to begin a new cycle.

13. A method to remove build material from a container comprising:
connecting, to the container, a conduit having a first open end to remove build material from the container when a gas flow is induced in the conduit;
at the beginning of a cycle, with a valve in the conduit being closed, operating a vacuum pump for a first period of time to build up a differential pressure between the container and a portion of the conduit separated by the valve from the container; and
opening the valve abruptly to release the differential pressure and to induce a pulsed gas flow into the conduit to remove build material from the container thereby aspirating build material from the container.

14. The method of claim 13, further comprising:
after a second period of time, closing the valve to begin a new cycle; and
with a number of repeated cycles, inducing pulses of gas flow from the container through the conduit connected to the container to aspirate, in pulses, the build material from the container.

15. The method of claim 14, wherein the second period of time ends and closing the valve is performed when the gas flow from the container through the conduit reaches substantially a steady-state.

16. The method of claim 14, further comprising:
closing the valve between the container and the conduit for the first period of time of at least one second so that turbulent airflow stops to allow build material to settle in the container; and
opening the valve between the container and the conduit for the second period of time of at least one second so that build material is aspirated from the container.

17. The method of claim 13, wherein a time to open the valve is less than 10% of a second period of time during which the valve is left open prior to closing the valve to begin a new cycle.

18. The method of claim 13, wherein a time to open the valve is less than 10% of a duty cycle comprising the first period of time and a second period of time during which the valve is left open prior to closing the valve to begin a new cycle.

19. A non-transitory computer readable storage medium comprising instructions that, when executed by a processor, cause the processor to:
at the beginning of a cycle, with a valve in a conduit that is connecting a container with a vacuum pump, close the valve and operate the vacuum pump for a first period of time to build up a differential pressure between the container and a portion of the conduit separated by the valve from the container; and
then, open the valve to release the differential pressure and induce a pulse of fluid flow into the conduit
so that build material is removed with the pulse of fluid flow flowing from the container through the conduit.

20. The non-transitory computer readable storage medium of claim 19 further comprising instructions that, when executed by a processor, cause the processor to:
control the valve to open and close in a cycle, so that a pulsed fluid flow is induced to remove build material from the container.

* * * * *